Patented June 30, 1931

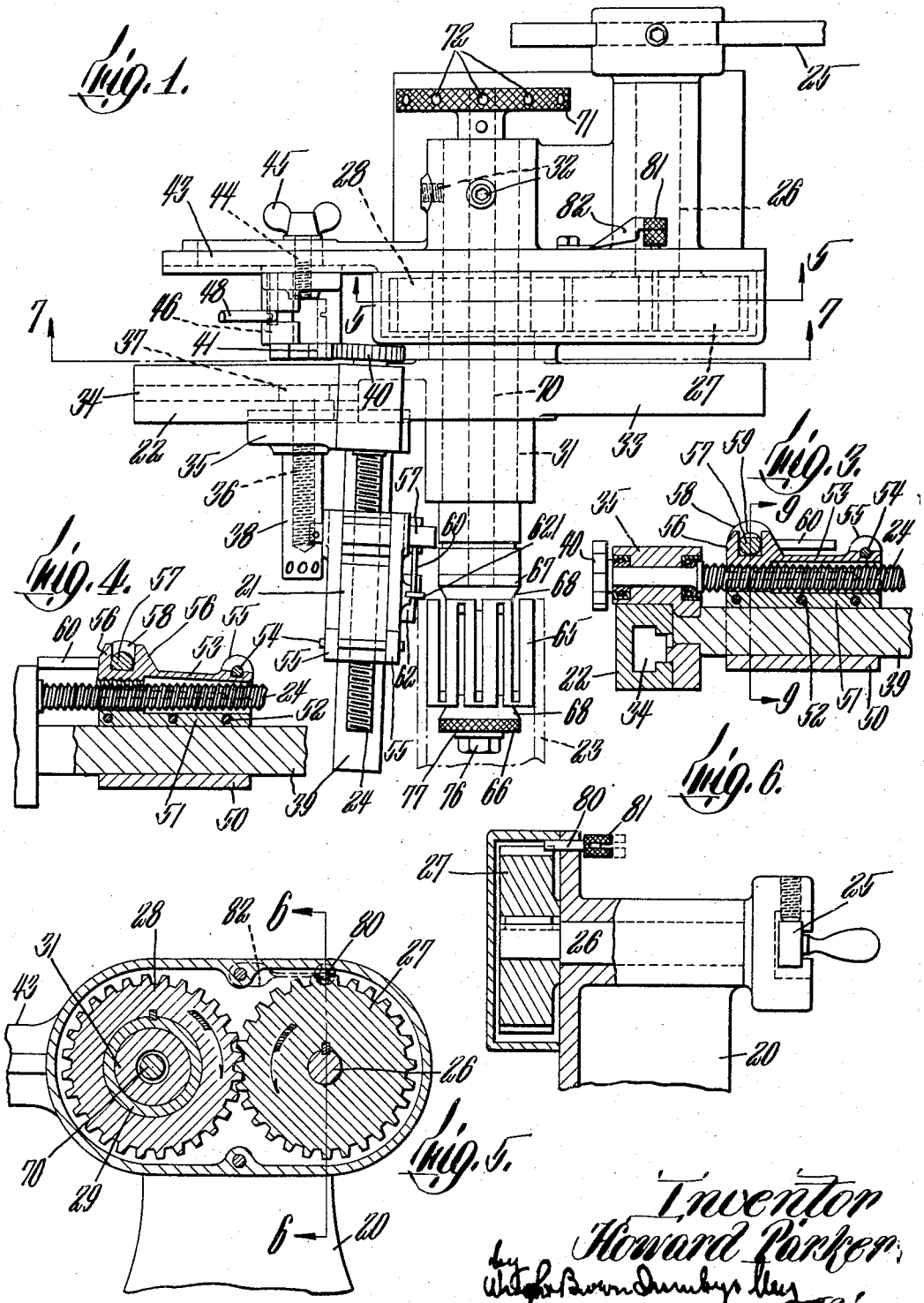

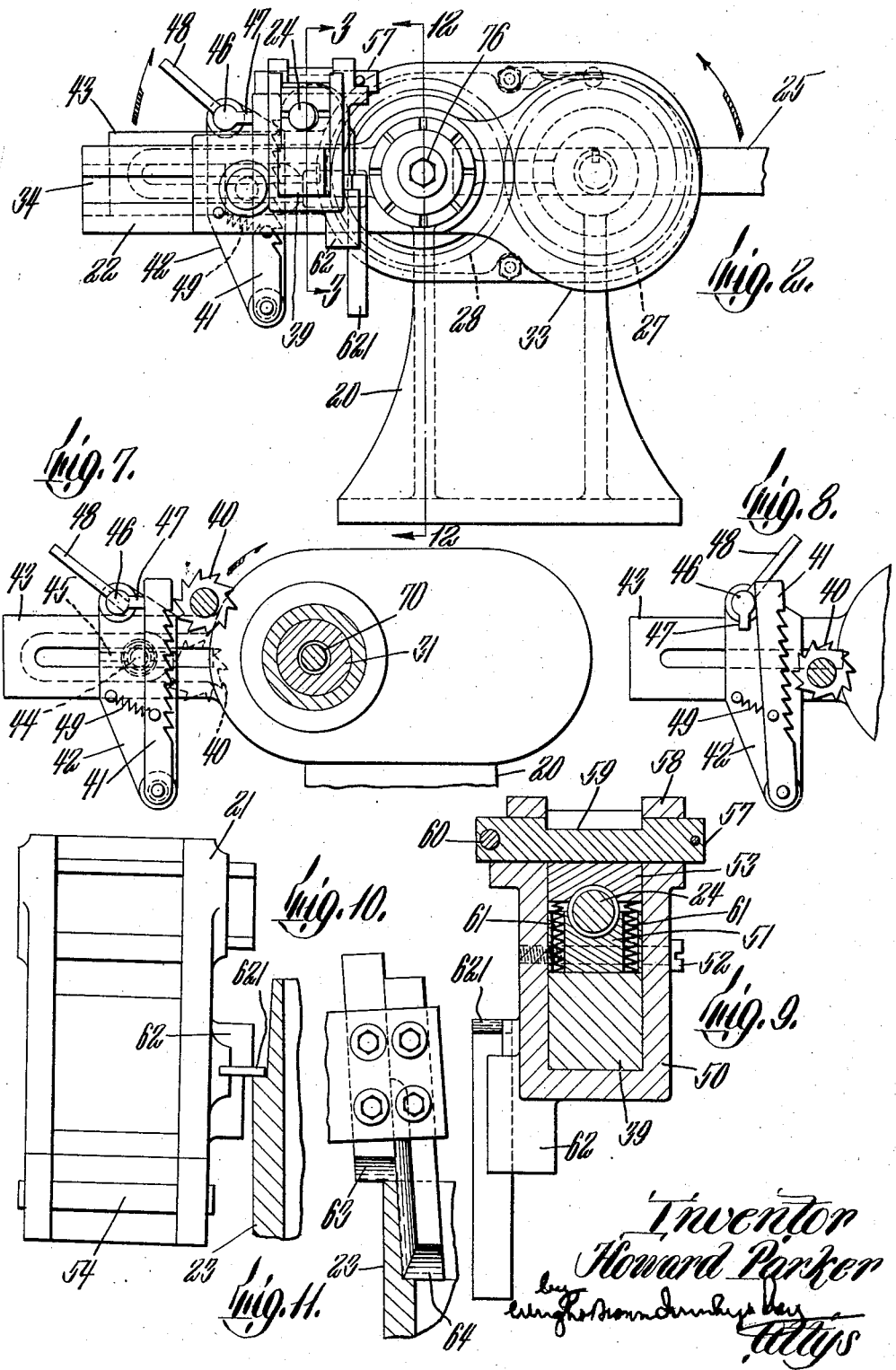

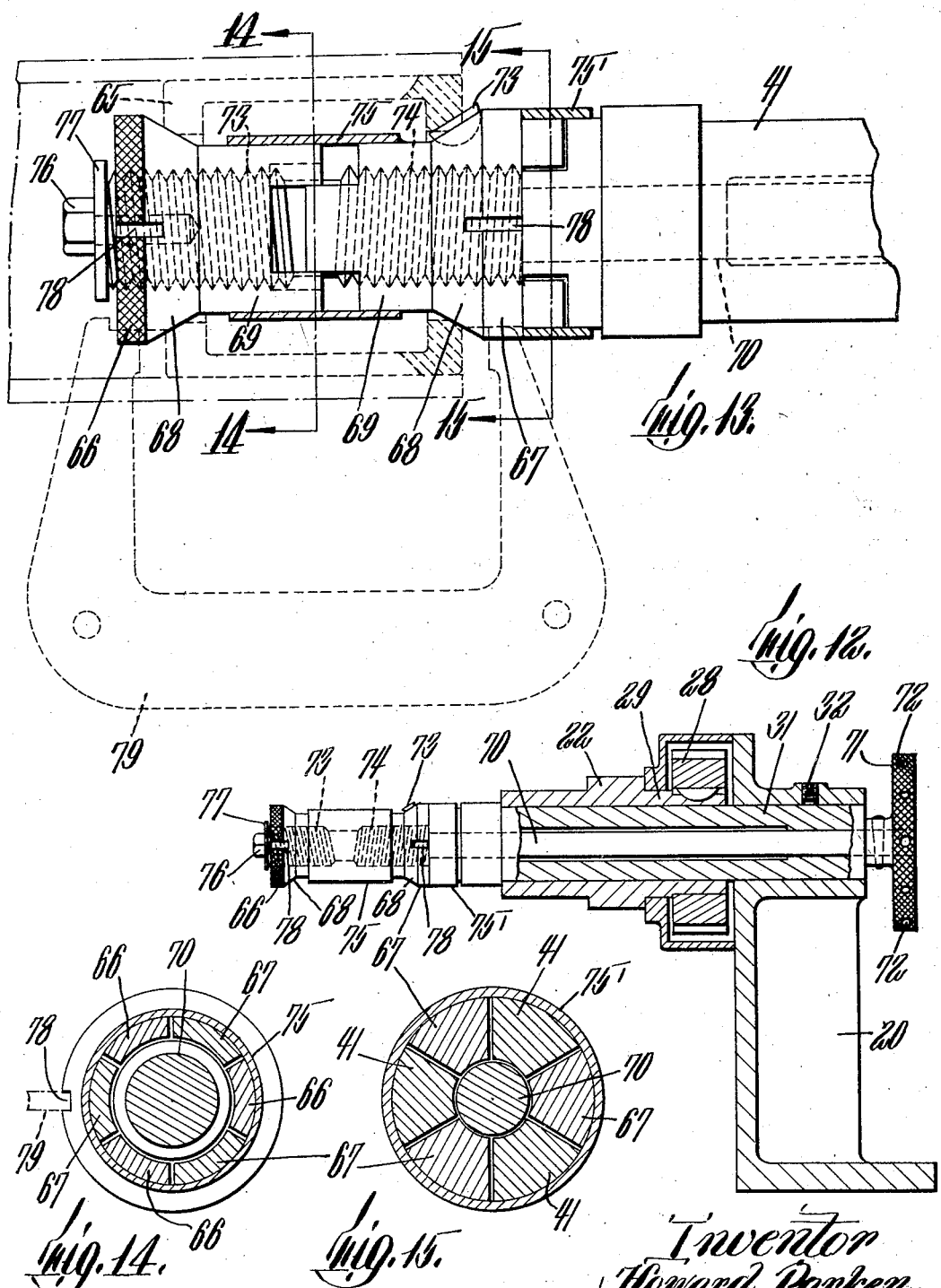

1,811,894

UNITED STATES PATENT OFFICE

HOWARD PARKER, OF BERLIN, NEW HAMPSHIRE, ASSIGNOR TO BROWN COMPANY, OF BERLIN, NEW HAMPSHIRE, A CORPORATION OF MAINE

FIELD POINTING MACHINE

Application filed September 21, 1926. Serial No. 136,735.

This invention relates to mechanism for shaping the ends of tubes or pipes, the mechanism being characterized by its relative lightness of weight, compactness of structure, and accuracy of performance. It has the added advantage of being composed of simple parts which are easily made, so that the cost of the complete machine is relatively low.

While the machine hereinafter described which is an embodiment of my invention is capable of operating on a wide range of materials, it is particularly designed for use with conduit tubes which are constructed of fibrous material such as interfelted cellulosic fibers which may be shaped into tubular form by any desired process and impregnated with a suitable saturant of asphaltic or equivalent compound. Such tubes may for example be made by progressively depositing a sheet of wood pulp on the cylinder of a paper machine, then rolling up the wet sheet of pulp upon itself under pressure to form a unitary homogeneous structure of interfelted fibers which when dried and impregnated with a suitable saturant, results in a product which is light and strong and is admirably adapted for use as conduits in many lines of work. In order to lay tight conduits of indefinite length, the ends of successive tubes or lengths must be secured together with tight joints. One method of accomplishing this is to taper the ends of the tubes on their exterior surface and drive them into short couplings which are tapered internally to receive the ends of the tubes in a tight fit and are usually of slightly larger diameter than the tubes. Cement may be applied, if desired, to the contact surfaces before making the joint. Another method is to taper one end of each tube with a shoulder between the uncut exterior surface and the tapered surface, the length of the tapered portion from the shoulder to the end of the tube being preferably the same for all the tubes. The opposite end of the tube is tapered on its inner surface and internally shouldered to form a complementary member for a tightly fitting joint with the externally tapered end of another tube. In this case, the end of each of the tubes making the joint abuts the shoulder on the other tube, and the surfaces of the tapered portions engage each other evenly if the tapers have been accurately cut. It is customary to use a suitable cement in a joint of this kind, the resulting conduit having a uniform external as well as internal diameter throughout its length, since no couplings are used.

According to present practice, the tapers of both the types described are cut at the mill where the tubes are made or where they are handled in quantity, special machinery being used to cut the tapers accurately and expeditiously, and the tubes and couplings are shipped ready to be put together. It frequently happens, however, that in the course of laying a conduit or pipe line, it becomes necessary to cut a length of tube, as for example when a bend must come at a certain place. It is a simple matter to saw the tube to the desired length, but extremely difficult to fashion the cut end to make a good fit and a tight joint without sending the piece to the mill. To obviate such difficulties in field work, the machine hereinafter described was devised. It is compactly built so as to be stowed with tools and accessories in a relatively small chest which is adapted to be used as a bench for the machine when the latter is secured by convenient fastening means on top of the cover thereof.

Further advantageous features will be apparent from the disclosure of the machine in the description and drawings, of which:—

Figure 1 is a plan view of the machine.

Figure 2 is a front end elevation of the same.

Figure 3 is a section on the line 3—3 of Figure 2.

Figure 4 is a section showing a portion of Figure 3 with the parts in a different position.

Figure 5 is a section on the line 5—5 of Figure 1.

Figure 6 is a section on the line 6—6 of Figure 5.

Figure 7 is a section on the line 7—7 of Figure 1.

Figure 8 shows a portion of Figure 7 with the parts in a different position.

Figure 9 is a section on the line 9—9 of Figure 3.

Figure 10 is a top view of the tool carriage showing its position relative to the work.

Figure 11 shows a special tool for forming an inside taper in the work.

Figure 12 is a section on the line 12—12 of Figure 2.

Figure 13 is an elevation, partly in section, of the chuck-holding mechanism.

Figures 14 and 15 are sections on the lines 14—14 and 15—15 of Figure 13.

Referring to Figures 1 and 2, the machine as a whole is a relatively light and compact structure supported on a suitable standard 20. A tool carriage 21 is adjustably mounted on an arm 22 which is pivotally supported near its center to swing the tool carriage around the work 23 coaxially therewith. The work on which the tool operates is held in fixed position, this arrangement making the apparatus equally useful for operating on the ends of straight lengths, bends, T-joints or other forms of conduit. A feed screw 24 is provided to feed the tool longitudinally of the work.

The driving mechanism comprises a hand crank 25 which is suitably connected to a shaft 26 on which is keyed a gear 27 and gear 28 which is keyed to a hub member 29 formed centrally on the arm 22 (Figure 12). The hub member 29 bears on a fixed quill 31 which is supported by the standard 20 and secured against motion by a set screw 32. The hub member 29 defines two portions of the arm 22, one of which carries a cutting head while the opposite portion is preferably in the form of a counterweight 33. The cutting head comprises a block 35 adapted to slide on the arm 22 and to be clamped thereto in adjusted position as by a bolt 36 and nut 38, the bolt 36 having a head 37 fitted to slide in an undercut slot or groove 34 in the arm 22. From the block 35 extends a squared stud or bar 39 on which the tool carriage is adapted to slide in its feeding motion. In order to produce the desired taper in the work, this stud 39 is fixed at an angle to the work equal to the angle of taper desired. As the tool carriage is moved outwardly along the stud 39 during the operation of the cutter, the inclination of the stud relative to the axis of the work will give the tool a motion divergent from the axis. The taper results from this divergence from the axial direction. Since for the particular service the machine illustrated in the drawings is designed, a standard unvarying taper has been adopted and maintained, the stud 39 is fixed at that definite angle as shown in Figure 1. It will be understood, however, that if there should be a call for tapers of various pitches, the stud 39 can readily be provided with a swivel mount so as to be capable of being adjusted to any desired angle and to produce thereby any desired taper.

The feeding mechanism may be of any suitable variety. As shown it comprises a feed screw 24 journaled in the block 35 and extending through the tool carriage 21 parallel to the stud 39. As shown in Figure 3 a star wheel 40 is fixed on the end of the screw 24 opposite the threaded portion. As the arm 22 revolves around the quill 31 in the operation of the machine, it carries with it the cutting head 35 and the members supported thereby, including the tool carriage 21 and the feed screw 24. The star wheel 40 thus describes a circle about the quill 31. In order to rotate the feed screw 24 and thus to advance the tool carriage 21, a rack 41 is provided to be engaged by the star wheel 40 and to rotate the same during the interval in which the teeth of the two are in mesh (Figure 7). The rack 41 is preferably mounted on a suitable plate 42 and may be adjustably secured to a suitable slotted arm 43 formed on the standard 20. As shown in Figure 1, a bolt 44 and wing nut 45 are provided to clamp the plate 42 to the arm 43. Thus whenever the position of the cutting head block 35 is adjusted for work of different sizes, the plate 42 may also be adjusted to position the rack 41 tangentially to the path of the star wheel 40. In order to enable the operator to remove the rack 41 temporarily from the path of the star wheel 40 without disturbing the adjustment of the supporting plate 42, a rotating bolt 46 is provided having a lug 47 thereon adapted to engage the rear face of the rack 41. The bolt 46 also has a handle 48 by which it may be turned to take the operative position illustrated in Figure 7, or the inoperative position shown in Figure 8. When the lug 47 is swung away from the rear face of the rack 41 as in Figure 8, the rack 41 is swung back on its pivot out of the path of the wheel 40 as by a spring 49 attached to the rack and to the plate 42.

The tool carriage 21 comprises a channeled block 50 adapted to fit closely on three sides of the stud 39 to slide thereon. The fourth side of the stud is engaged by the lower portion 51 of a split nut which is secured as by screws 52 within the channel of the block 50. The upper portion 53 of the split nut is held in position in the channel of the block 50 by a pin 54 passing through a pair of ears 55 formed on the upper portion of the block 50 and engaging in a transverse groove in the upper face of the split nut member 53, permitting a limiting rocking motion of the member 53 about the pin 54. The member 53 at its other end is provided with a pair of upstanding transverse ridges 56 between which a bolt 57 extends, which also passes through a pair of ears 58 formed on the block 50. A portion of the bolt is cut away for a portion of its length forming a recess as at 59 between the ears 58 registering with the split nut member 53 (Figure 9). The lower member 51 of the split nut is not threaded at all, the upper member 53 being threaded only for a short distance at the end thereof which is in contact with the bolt 57. The bolt is provided with a suitable handle 60 by which it may be turned to bring the recess 59 up as shown in Figure 3, or down as shown in Figure 4. In the former case, the threaded portion of the member 53 will be held in engagement with the thread of the screw 24, while in the latter case the threaded portion of the member 53 will be held out of engagement with the thread of the screw 24 as by suitable springs 61 set into member 51 and pressing against the lower face of the member 53. Thus by manipulating the handle 60, the tool carriage 21 may be made to feed or not as desired, and by disengaging the feed, the carriage may be slid at once to any desired point on the stud 39.

The tool carriage is provided with a grooved lug 62 to hold a cutting tool 621 (Figure 10). This tool is fixed in position on the tool carriage and cuts a taper by reason of the angular mounting of the stud 39 on the cutting head 35 as previously described. By operating the machine to cut to the point reached by the tool shown in Figure 10 and then stopping, a shoulder may be left in the work against which the end of the complementary piece may abut in forming a joint. In order to use this machine for shaping the female portion of the joint by tapering the inside surface of the work, a tool comprising a pair of cutters 63 and 64, as illustrated in Figure 11, may be mounted on the tool carriage, the cutter 63 being adapted to trim the end of the work, and the cutter 64 being provided with cutting edges on both its end and one side, the side edge being designed to cut the tapered surface from the end to form a shoulder. The cutters 63, 64 are mounted on an angle to the carriage, the angle being twice that between the stud 39 and the axis of the work so as to overcome the effect of the divergent motion of the tool carriage and to cut a surface tapering oppositely by the same angle on the inner surface of the work which will be complementary to the ends tapered on their exterior surface.

An expanding chuck 65 is provided to be inserted in an end of the work and by expansion to grip the work securely during the operation of the cutter. The holder for the expanding chuck is shown in Figure 13. This comprises a pair of nuts 66, 67, each nut being provided with a tapered portion 68 and a reduced portion 69, the latter being castellated and adapted to interfit so as to prevent relative rotation of the nuts. The nut 67 is also castellated at its opposite end to interfit with complementary castellations on the end of the quill 41. Since the latter is fixed against rotation by the set screw 32, the nuts 66, 67 are likewise fixed against rotation, but are permitted a limited longitudinal movement relative to each other and to the quill 41. Journaled within the quill 41 is a spindle 70 to one end of which is pinned a hand wheel 71 provided with recesses 72 in its periphery to receive a tool for tight setting up. On the opposite end portion of the spindle 70 are cut right and left hand threads as at 73, 74 on which threads the nuts 66, 67 respectively are mounted. Since the nuts are held against rotation in any direction, it will be apparent that the rotation of the spindle 70 by the hand wheel 71 will cause the nuts 66, 67 to move simultaneously toward or away from each other, according to the direction of rotation of the spindle. Since the expanding chuck 65 is made of such a length as to be supported by the inclined faces of the tapered portions 68, motion of the nuts toward each other will cause the chuck 65 to expand; and since both nuts move by an equal amount, no longitudinal displacement of the chuck will be caused thereby. In order to maintain the chuck against rotation during the operation of the cutter, a slot may be provided therein to engage a key 73 in the nut 67. Suitable dust sleeves 75, 75' may be provided to cover the apertures between the nuts 66, 67 and between the nut 67 and the end of he quill 41. These sleeves may be loose or for convenience attached to the nut 67. In order to exchange chucks for use with work of different sizes, it is necessary to remove the nut 66 from the spindle 70, hence the nuts 66, 67 are so positioned on the threaded portions of the spindle that when they reach their position of maximum separation by the manipulation of the hand wheel 71, their inter-engaging ends will just clear each other so that by removing the retaining bolt 76 and washer 77 from the end of the spindle 70, the nut 66 may be unscrewed therefrom. In replacing the nut 66, it is screwed up to its normal position of maximum separation from the nut 67, in which position the complementary portions of the two nuts should be aligned. In order to provide for ready alignment, notches 78 may be cut in the nuts 66, 67 which will be in line whenever complementary ends of the nuts are in line. A bridge gauge 79 may be provided so shaped that its ends will fit into the notches 78 when in line. With the gauge in position a slight turn of the hand wheel 71 will bring the castellated ends of the nuts into engagement.

In order to hold the moving parts of the cutting mechanism and driving parts in fixed position, as for example, when adjustments are being made, a suitable pin 80 may be inserted through the standard 20 in a position projecting between successive teeth in the gear 27, thus holding the arm 22 and its associated parts against rotation. The pin 80 is manipulated as by a knurled head 81 which is slotted to receive a limit stop member 82 which prevents the complete removal of the pin from the housing.

The machine as a whole is constructed as lightly as possible consistent with sufficient strength to withstand rough usage. The expanding chuck which grips the work from within insures accurate registration of the interior surfaces of successive tubes when joined together, so that no shoulders appear on the inner wall of the finished conduit. The machine is easy to set up and operate, and cuts the tapers with a high degree of accuracy so that tight and satisfactory joints can be quickly made of tubes which are cut on the field without having to resort to the mill or a machine shop.

Having thus described an embodiment of my invention, it should be evident to those skilled in the art that many changes and modifications may be made therein without departing from its spirit or scope as defined by the appending claims.

I claim:

1. A machine for shaping ends of tubes, comprising an expansible chuck adapted to enter the end of a tube, a support for said chuck, means for holding said chuck against rotation relative to said support, means actuable to expand said chuck without longitudinal displacement, a tool carriage, means actuable to revolve the carriage about the work, and means for feeding the carriage along the work.

2. A machine for shaping ends of tubes, which comprises an expanding chuck adapted to enter an end of the work, means actuable to expand the chuck without longitudinal displacement thereof or change of axis, a tool carriage, mechanism actuable to revolve the carriage about the work, said mechanism comprising a crank arm having a hub portion disposed coaxially with said chuck, a stud mounted on said arm for adjustment longitudinally thereof, said stud having a predetermined angular relation to the plane of revolution of the carriage and being adapted to slidably support said carriage, a feed screw disposed parallel to said stud and engageable by said carriage, and means for rotating said feed screw as the carriage is revolved about the work.

3. A machine for shaping the ends of tubes, which comprises a standard having a horizontal bore, a cylindrical quill fixed within said bore and projecting therefrom, a shaft extending through said quill and rotatable therein, an expanding chuck extending coaxially from the projecting portion of said quill and interlocked therewith against relative rotation, said chuck being operatively connected to said shaft for expansion and contraction by rotation thereof, a hand wheel on said shaft, a hub member loosely mounted on the projecting portion of said quill, a crank arm fixed on said hub and extending radially therefrom, a stud adjustably mounted on said arm at a predetermined angle to the plane of rotation of said arm, a tool carriage slidably mounted on said stud, means for intermittently feeding said carriage along said stud during the operation of the machine, a gear keyed on said quill, and a driving gear meshing with said keyed gear.

4. A machine of the class described comprising means engaging with the work to hold it against rotation, a tool carriage, means actuable to revolve said carriage about the work, and means for feeding said carriage along the work, said feeding means including a feed screw, an element carried by said carriage normally in threaded engagement with said feed screw, and a member rockable to move said element into and out of threaded engagement with said screw.

In testimony whereof I have affixed my signature.

HOWARD PARKER.